(12) United States Patent
Findeklee et al.

(10) Patent No.: US 12,457,048 B2
(45) Date of Patent: Oct. 28, 2025

(54) RADIO FREQUENCY (RF) RECEIVER SYSTEM WITH ACTIVE DECOUPLING

(71) Applicant: KONINKLIJKE PHILIPS N.V., Eindhoven (NL)

(72) Inventors: Christian Findeklee, Norderstedt (DE); Christoph Günther Leussler, Hamburg (DE); Ingo Schmale, Hamburg (DE); Oliver Lips, Hamburg (DE); Peter Vernickel, Hamburg (DE); Peter Caesar Mazurkewitz, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 320 days.

(21) Appl. No.: 18/270,002

(22) PCT Filed: Dec. 22, 2021

(86) PCT No.: PCT/EP2021/087376
§ 371 (c)(1),
(2) Date: Jun. 28, 2023

(87) PCT Pub. No.: WO2022/144283
PCT Pub. Date: Jul. 7, 2022

(65) Prior Publication Data
US 2024/0063924 A1 Feb. 22, 2024

(30) Foreign Application Priority Data
Jan. 4, 2021 (EP) .................................. 21150017

(51) Int. Cl.
*H04B 17/21* (2015.01)
*G01R 33/36* (2006.01)

(52) U.S. Cl.
CPC ........... *H04B 17/22* (2023.05); *G01R 33/365* (2013.01)

(58) Field of Classification Search
CPC ............ G01R 33/3415; G01R 33/5611; G01R 33/3621; G01R 33/3664; G01R 33/5608;
(Continued)

(56) References Cited

U.S. PATENT DOCUMENTS

| 6,621,433 B1 * | 9/2003 | Hertz ................. G01R 33/3621 324/309 |
| 7,336,074 B2 | 2/2008 | Yang et al. |

(Continued)

OTHER PUBLICATIONS

Kuzmin et al: "Signal feedback applications in low-field NMR and MRI",Journal of Magnetic Resonance, Academic Press, Orlando, FL, us,vol. 310, Oct. 30, 2019 (Oct. 30, 2019).
(Continued)

*Primary Examiner* — Ajibola A Akinyemi

(57) ABSTRACT

For a radio frequency (RF) receiver system (1) for use in a magnetic resonance (MR) imaging system, a solution for compensating residual coupling of RF receive coil elements (2) in the radio frequency (RF) receiver (1) system shall be created. This is achieved by a radio frequency (RF) receiver system for use in a magnetic resonance (MR) imaging system, the RF receiver system (1) comprising at least two simultaneously used RF receive coil elements (2), wherein the RF receive coil element (2) comprises a signal generator (3) for providing a compensation signal and an excitation path (4), wherein the excitation path (4) is configured to couple the compensation signal into the RF receive coil element (2), for reducing residual coupling in the RF receiver system (1) by means of the compensation signal coupled into the RF receive coil element (2). The present invention also refers to a magnetic resonance (MR) imaging system, a method for active decoupling of a radio frequency (RF) receiver system (1) of a magnetic resonance (MR) imaging system, a software package for a magnetic resonance (MR) imaging system, a software package for upgrad-
(Continued)

ing a magnetic resonance (MR) imaging system and a computer program product comprising instructions which, when the program is executed by a computer, cause the computer to carry out the steps of the method as described in the claims.

15 Claims, 2 Drawing Sheets

(58) Field of Classification Search
CPC .......... G01R 33/4824; G01R 33/34084; G01R 33/34007; G01R 33/3692; G01R 33/543; G01R 33/5659; G01R 33/36; G01R 33/365; G01R 33/56509; G01R 33/341; G01R 33/4806; G01R 33/4835; G01R 33/5612; G01R 33/561; G01R 33/56308
USPC ...................................................... 455/552.1
See application file for complete search history.

(56) References Cited

U.S. PATENT DOCUMENTS

| | | | |
|---|---|---|---|
| 2005/0200357 A1* | 9/2005 | Pruessmann | G01R 33/5611 324/309 |
| 2007/0222449 A1 | 9/2007 | Hoult | |
| 2008/0258728 A1 | 10/2008 | Vernickel et al. | |
| 2012/0257806 A1* | 10/2012 | Sheltraw | A61B 5/055 382/131 |
| 2014/0292337 A1 | 10/2014 | Adalsteinsson et al. | |
| 2015/0323623 A1 | 11/2015 | Adalsteinsson et al. | |
| 2015/0346295 A1 | 12/2015 | Reykowski | |
| 2018/0023978 A1 | 1/2018 | Yoshiya | |

OTHER PUBLICATIONS

International Search Report and Written Opinion from PCT/EP2021/087376 mailed Mar. 16, 2022.

Vernickel et al "Active Digital Decoupling for Multi-channel transmit MRI Systems" Proc. Intl. Soc. Mag. Reson. Med 15 (2007) p. 170.

Mahmood et al "Design of Robust Decoupling Matrix for High Field Parallel Transmit Arrays" Proc. Intl. Soc. Mag. Reson. Med. 22 (2014).

O'Connell et al "General Coupling Matrix Synthesis for Decoupling MRI RF Arrays" IEEE Transactions on Medical Imaging, vol. 35, No. 10, Oct. 2016.

Liang et al "Study on the decoupling of stacked phased array coils for magnetic resonance imaging" Progress in Electromagnetics Research Symposium : 601-604. ScholarBank@NUS Repository. (2011).

* cited by examiner

RADIO FREQUENCY (RF) RECEIVER SYSTEM WITH ACTIVE DECOUPLING

CROSS REFERENCE TO RELATED APPLICATIONS

This application is a U.S. national phase application of International Application No. PCT/EP2021/087376 filed Dec. 22, 2021, which claims the benefit of EP application Ser. No. 21/150,017.8 filed Jan. 4, 2021 and is incorporated herein by reference.

FIELD OF THE INVENTION

The invention relates to the field of magnetic resonance (MR) imaging. In particular, the invention relates to a radio frequency (RF) receiver system with active decoupling. The invention further relates to an MR imaging system, a method for active decoupling of a radio frequency (RF) receiver system, a software package for a magnetic resonance (MR) imaging system, a software package for upgrading a magnetic resonance (MR) imaging system and a computer program product.

BACKGROUND OF THE INVENTION

In magnetic resonance imaging (MRI), array coils are used for decades to improve both, image quality (signal-to-noise-ratio, SNR) and speed (e.g., by accelerated imaging e.g., via Sensitivity Encoding, SensE). These techniques demand at least to some degree decoupled coil elements. The most common technique for decoupling is to use a precisely defined overlap of neighboring coil elements to zero the shared magnetic flux.

A modern coil with a high channel count typically suffers from residual coupling, which cannot be compensated by traditional decoupling methods like overlapping elements. This mainly arises from the non-neighboring elements. Especially in high field applications, coupling is also patient load dependent, which cannot be compensated by a fixed overlap. So far, the residual coupling was considered as given since its impact on the image quality was too low to justify countermeasures.

However, nowadays thin and flexible coils arrays are in development and production, drastically increasing the demands for compensating residual coupling. For this type of arrays, coil coupling varies over a wide range, since coil elements come closer to the tissue and due to the flexibility and foldability coil coupling cannot be cancelled by classical static means like overlap, transformers or shared capacitors. Therefore, new means are required to compensate for residual coupling in a wide, individually adjustable range.

The US patent application US2018/023978 discloses a magnetic resonance imaging system comprising a circuit for an RF receive coil using GaN FETs to couple and decouple the receive electronics form the RF coil. In particular an active decoupling circuit is provided to reduce inductive coupling between radio frequency coils in a multi-coil transmit/receive system. A feedback circuit is provided to couple negative flux into the RF receive coil mitigating the inductive coupling effect on nearby coil. This known feedback circuit only feeds back output of the RF receiver coil to generate negative flux in the same RF receiver coil.

SUMMARY OF THE INVENTION

It is an object of the invention to provide a radio frequency (RF) receiver system, wherein residual coupling can be actively compensated.

According to the invention, this object is addressed by the subject matter of the independent claims. Preferred embodiments of the invention are described in the sub claims.

Therefore, according to the invention, a radio frequency (RF) receiver system for use in a magnetic resonance (MR) imaging system is provided, the RF receiver system comprising at least two simultaneously used RF receive coil elements, wherein each RF receive coil element comprises a signal generator for providing a compensation signal and an excitation path, wherein the excitation path is configured to couple the compensation signal into the RF receive coil element, for reducing residual coupling in the RF receiver system by means of the compensation signal coupled into the RF receive coil element.

Hence, it is an essential idea to compensate for the coupling by means of a compensation signal coupled into each single RF receive coil by an excitation path. In other words, it is proposed to feed active decoupling signals generated from a linear combination of all RF receive coil elements into the coil elements of an RF receiver system in order to decouple the coil elements. The term "RF receive coil element" refers in the context of this invention to a single physical receive unit like a loop, or refers to one mode of a complex resonator, like the modes of a birdcage resonator.

The RF receiver channels are in mutual correspondence by a transverse communication circuit and for each RF receiver coil element (2) its compensation signal is dependent on the outputs of one or more respective other RF receiver coil element (2) of the RF receiver system and for each RF receiver coil element the transverse communication circuit is configured to provide the compensation signal to the respective excitation path. The transverse communication circuit may be configured as a fast bidirectional data bus providing correspondences between the RF receiver coil elements among each other. The transverse communication circuit may be coupled to a host that further processes the received signals from the RF receiver coil elements. Alternatively, transverse communication circuit may be configured to directly combine the controllers in the RF signal channels from the couple the RF receiver channels to a common controller to serve several RF receiver coils via their respective excitation path elements to be decoupled.

According to a preferred embodiment of the invention, the excitation path comprises a loop element for coupling the compensation signal into the RF receive coil element. By means of a loop element it is easy to couple a flux into the coil element.

Alternatively, according to another preferred embodiment the excitation path is realized by a coupling circuit which is configured to couple the compensation signal into the RF receive coil element, wherein the coupling circuit comprises at least one lumped element or a transmission line to couple the compensation signal into the RF receive coil element.

According to a preferred embodiment, each RF receive coil element comprises a matching network, wherein the coupling circuit is integrated into the matching network of the RF receive coil element.

According to another preferred embodiment of the invention, the RF receive coil element comprises a digital receive chain for digitization of the signals received by the RF receive coil element.

The digital receive chain with digitization directly on the RF receive coils allows easy decoupling of the RF receive coil elements.

According to an embodiment of the invention, the digital receive chain of each RF receive coil comprises a controller, wherein the controllers are connected by a fast bidirectional data bus. An existing controller of the RF coils can be used to perform the necessary calculations for decoupling. A fast and easy data exchange is ensured by fast bidirectional data bus between the controllers of different RF receive coils.

In an embodiment of the invention, the RF receiver system comprises a digital-to-analog converter, DAC for each RF receive coil element, wherein the DAC is configured to generate the compensation signal.

According to an embodiment of the invention, the RF receive coil is a flexible and/or foldable and/or arbitrarily shaped RF receive coil. The invention relates to all kind of array receive coils, however, especially for flexible coils with strong patient coupling, the adaption to the load changes can be considered with the proposed RF receiver system.

The invention further relates to a magnetic resonance (MR) imaging system, comprising a radio frequency (RF) receiver system as previously described.

The invention also relates to a method for active decoupling of a radio frequency (RF) receiver system the method comprising the following steps:
  providing a radio frequency (RF) receiver system as previously described,
  generating a compensation signal by the signal generator of each RF receive coil element,
  coupling the compensation signal $B\vec{y}$ into the corresponding RF receive coil element by the excitation path and receiving a coupled complex signal vector $\vec{y}=A(\vec{x}+B\vec{y})$ by all RF receive coils elements, wherein $\vec{x}$ is a signal vector received inside the RF receive coils without coupling,
  compensating for the coupling of the coupled complex signal vector $\vec{y}=A\vec{x}$. According to another embodiment of the invention, the step of compensating for the coupling of the coupled complex signal vector $\vec{y}=A\vec{x}$ comprises the step of:
  multiplying the vector $\vec{y}$; by a corresponding row of the matrix B for each RF receive coil element and feed the result via the excitation path into the receive signal of the RF receive coil element, wherein $B=A^{-1}-1$, 1 being the identity matrix.

According to a preferred embodiment, each RF receive coil element comprises a digital receive chain for digitization of the signals received by the RF receive coil elements, the digital receive chain of each RF receive coil element comprising a controller, wherein the step of multiplying the corresponding row of the matrix B with the vector $\vec{y}$; is performed on the controller.

The invention further relates to a method for active decoupling of a radio frequency (RF) receiver system the method comprising the following steps:
  compensating for the coupling of the coupled complex signal vector $\vec{y}=A\vec{x}$ by multiplying $\vec{y}$ with the inverse $A^{-1}$ from the left.

The invention also relates to a software package for a magnetic resonance (MR) imaging system, whereby the software package contains instructions for controlling a radio frequency (RF) receiver system according to the method as previously described.

The invention further relates to a software package for upgrading a magnetic resonance (MR) imaging system, whereby the software package contains instructions for controlling a radio frequency (RF) receiver system according to the method as previously described.

Finally, the invention relates to a computer program product comprising instructions, which, when the program is executed by a computer, cause the computer to carry out the steps of the method as previously described. That is, the computer program product of the invention comprises instructions which, when the program is executed by a computer, cause the computer to carry out the steps of the method as defined in the claims 11 to 13.

BRIEF DESCRIPTION OF THE DRAWINGS

These and other aspects of the invention will be apparent from and elucidated with reference to the embodiments described hereinafter. Such an embodiment does not necessarily represent the full scope of the invention, however, and reference is made therefore to the claims and herein for interpreting the scope of the invention.

In the drawings.

DETAILED DESCRIPTION OF EMBODIMENTS

Figure 1:
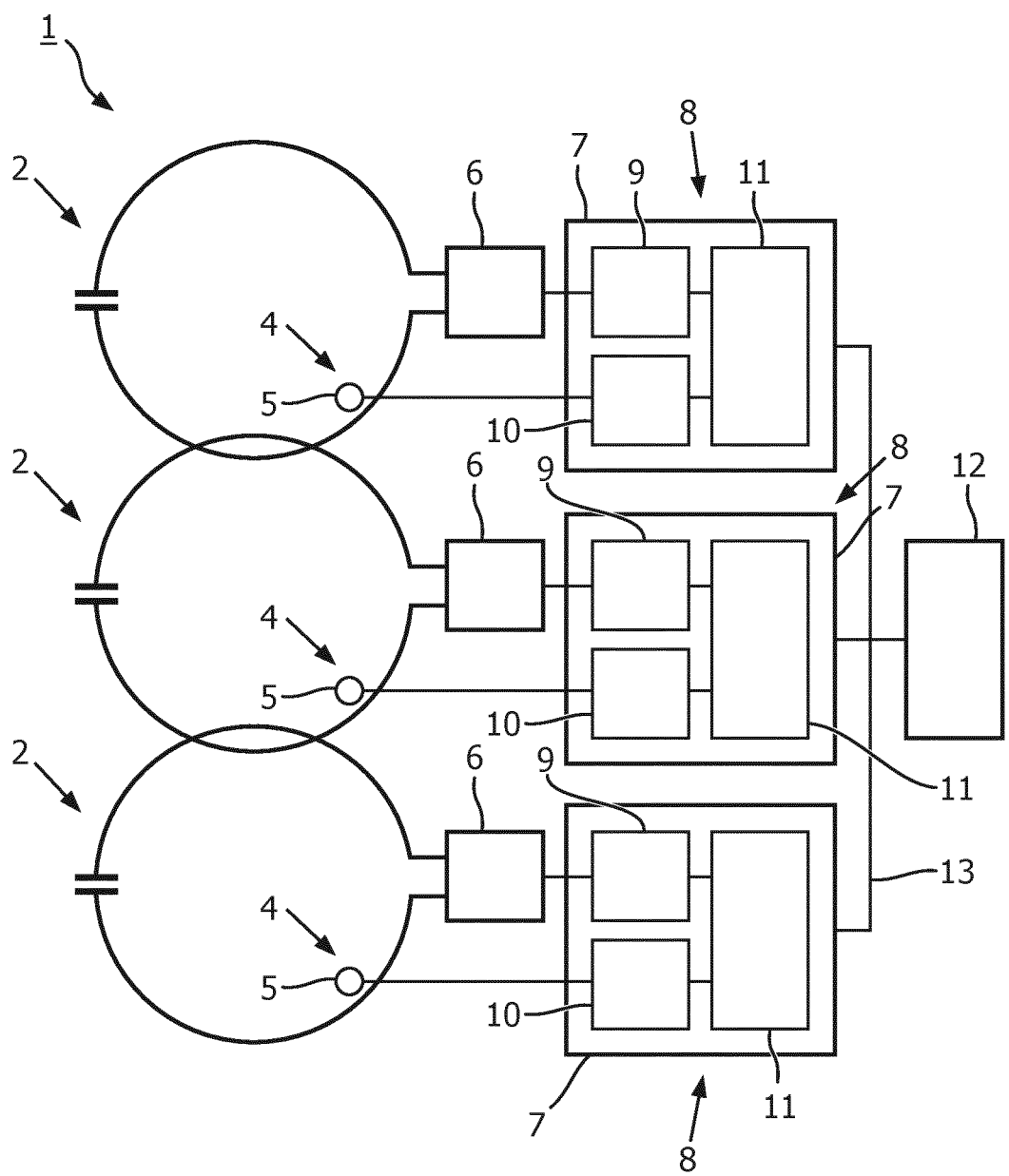
FIG. 1 schematically depicts a radio frequency (RF) receiver system with RF receive coil elements and three excitation paths according to an embodiment of the invention.

FIG. 1 schematically depicts a radio frequency (RF) receiver system 1 with three RF receive coil elements 2 and three excitation paths 4 according to an embodiment of the invention. Each of the RF receive coil elements 2 is equipped with an analog match/detune/preamp section 6 followed by an analog/digital chip 7. The excitation path 4 of each RF receive coil element 2 is sketched in FIG. 1 by a small coupling loop 5 for coupling flux into the RF receive coil element 2. Alternatively, also a coupling circuit, wherein the coupling circuit comprises at least one lumped element or a transmission line to couple the compensation signal into the RF receive coil element, can be integrated e.g., to the matching network. Furthermore, each RF receive coil element 2 of the RF receiver system 1 is equipped with a signal generator 10 for providing a compensation signal. In an embodiment of the invention the signal generator 10 is a digital-to-analog converter, DAC. It may be provided that each RF receive coil element 2 comprises a digital receive chain 8 for digitization of the signals received by the RF receive coil element 2. This is particularly advantageous since the digital receive chain 8 of each RF receive coil element 2 can comprise a controller 11, wherein the controllers 11 of different RF receive coil elements 2 are connected by a fast bidirectional data bus 13 among each other and to a host 12. The host 12 further processes the received digitized signals from the RF receiver coil elements 2. In an embodiment of the invention the controllers 11 might even be combined directly to a common controller or one controller 11 might serve several elements. The controller 11 of the RF receive coil element 2 could not only be intended for controlling the RF receive coil element 2 but can also be used to calculate the compensation of the coupling of the RF receive coils 2 in the RF receiver system 1.

Figure 2:
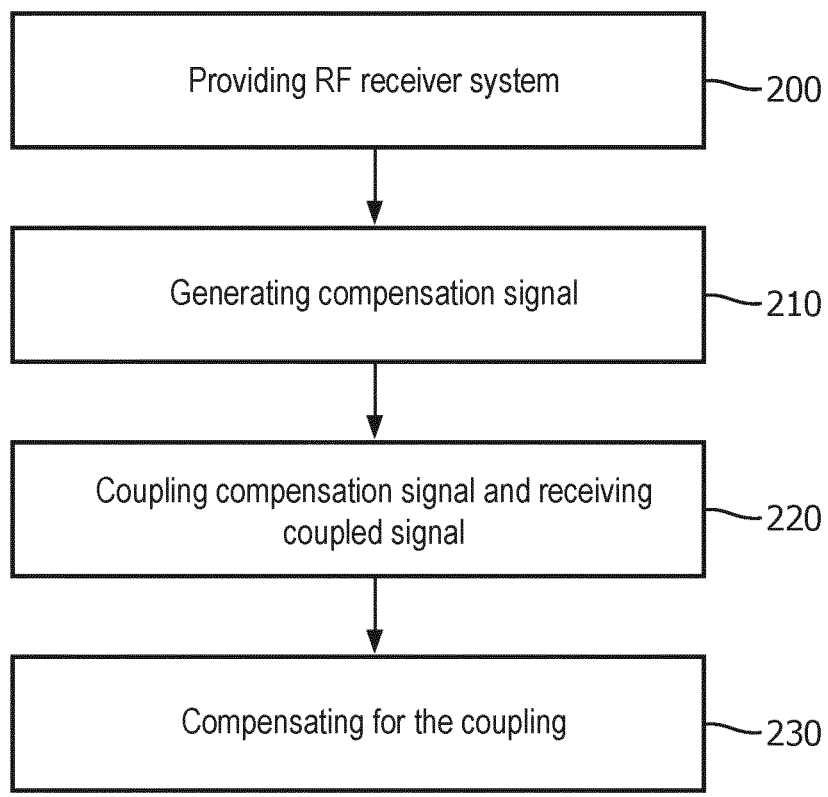
FIG. 2 depicts a flow chart of a method for active decoupling of a radio frequency (RF) receiver system according to an embodiment of the invention.

FIG. 2 depicts a flow chart of a method for active decoupling of a radio frequency (RF) receiver system 1 according to an embodiment of the invention. The method starts with step 200, in which a radio frequency (RF) receiver system 1 is provided. The RF receiver system 1 comprises at least two simultaneously used RF receive coil elements 2. The term "coil element" can also include system integrated coils. Therefore, in an embodiment of the invention the RF receive coil element can also be a system integrated coil e.g., a bodycoil, and/or local receive coils. The invention can also be used to combine those system integrated coils. Each RF receive coil element 2 comprises a signal generator 10 for providing a compensation signal. The RF receive coil element 2 further comprises an excitation path 4, wherein the excitation path 4 is configured to couple the compensation signal into the RF receive coil element 2. The excitation path 4 can e.g., comprise a small coupling loop 5 for coupling flux into the RF receive coil 2 as sketched in FIG. 1. In step 210 the compensation signal is generated by the signal generator 10 of each RF receive coil element 2. In Step 220 the compensation signal generated by the signal generator 10 is coupled into the corresponding RF receive coil element 2 by the excitation path 4. At the same time, a coupled complex signal vector $\vec{y}=A\vec{x}$ is received by all RF receive coils 2, wherein $\vec{x}$ is a signal vector received inside the RF receive coils 2 without coupling. In step 230 the coupling is compensated of the coupled complex signal vector $\vec{y}=A\vec{x}$. In an embodiment of the invention each RF receive coil element 2 comprises a digital-to-analog converter DAC for generating a compensation signal that is coupled into the corresponding RF receive coil element 2. At the same time, analog-to-digital converters ADCs in all RF receive coil elements 2 are receiving a coupled complex (magnitude and phase) signal vector $\vec{y}$. Due to linearity, for each signal vector $\vec{x}$ received inside the RF receive coils 2 without coupling, the corresponding vector $\vec{y}=A\vec{x}$ is received. Due to coupling, the matrix A is non-diagonal. In an embodiment of the invention to compensate for the coupling, $\vec{y}$ is multiplied with the inverse, $A^{-1}$ from the left in a post-processing. In another embodiment of the invention, the coupling can already be compensated directly before digitization of the received signals by the RF receive coil 2 by coupling the correct linear combination described by a matrix B $\vec{y}$. In that case a signal $\vec{y}=A(\vec{y}+B\vec{x})$ is received which becomes exactly the receive signal vector $\vec{x}$ for $B=(A^{-1}-1)$. For each RF receive coil 2, the corresponding row of the matrix B is multiplied with the vector $\vec{y}$. Preferably, this multiplication is performed directly on the corresponding controller 11 using a fast bidirectional data bus 13 connecting the controllers 11.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Further, for the sake of clearness, not all elements in the drawings may have been supplied with reference signs.

REFERENCE SYMBOL LIST radio frequency (RF) receiver system 1
RF receive coil element 2
excitation path 4
coupling loop 5
analog match/detune/preamp section 6
analog/digital chip 7
digital receive chain 8
analog-to-digital converter 9
signal generator/digital-to-analog converter 10
controller 11
host 12
bidirectional data bus 13

The invention claimed is:

1. A radio frequency (RF) receiver system for use in a magnetic resonance (MR) imaging system, the RF receiver system comprising:
    two or more RF receive coil elements, and two or more RF signal channels, each RF reciever coil being coupled to a respective RF signal channel
    each RF receive coil element comprising a signal generator for providing a compensation signal and an excitation path (4), wherein the excitation path is configured to couple the compensation signal into the RF receive coil element, wherein the each RF receive coil element is configured for reducing residual coupling in the RF receiver system by means of the compensation signal coupled into the RF receive coil element, wherein
    the two or more RF receiver channels are in mutual correspondence by a communication circuit coupled in a transverse direction and
    for each RF receive coil element its compensation signal is dependent on the outputs of one or more respective other RF receiver coil element of the RF receiver system and for each RF receiver coil element the transverse communication circuit is configured to provide the compensation signal to the respective excitation path.

2. The radio frequency (RF) receiver system according to claim 1, wherein for each RF receiver coil element the respective transverse communication circuit is configured to generate its decoupling signal-from a linear combination of all RF receive coil elements into the coil elements of the RF receiver system.

3. The radio frequency (RF) receiver system according to claim 1, wherein the excitation path comprises a loop element for coupling the compensation signal into the RF receive coil element.

4. The radio frequency (RF) receiver system according to claim 3, wherein each RF receive coil element comprises a matching network, wherein the coupling circuit is integrated into the matching network of the RF receive coil element.

5. The radio frequency (RF) receiver system according to claim 1, wherein the excitation path is realized by a coupling circuit which is configured to couple the compensation signal into the RF receive coil element, wherein the coupling circuit comprises at least one lumped element or a transmission line to couple the compensation signal into the RF receive coil element.

6. The radio frequency (RF) receiver system according to claim 1, wherein for each RF receive coil element the RF receiver channels is configured as a digital receive chain for digitization of the signals received by the RF receive coil element.

7. The radio frequency (RF) receiver system according to claim 6, wherein the digital receive chain of each RF receive coil element comprises at least two controllers, wherein the at least two controllers are connected with each other by a fast bidirectional data bus.

8. The radio frequency (RF) receiver system according to claim 1, wherein the RF receiver system comprises a digital-to-analog converter, DAC for each RF receive coil, wherein the DAC is configured to generate the compensation signal.

9. The radio frequency (RF) receiver system according to claim 1, wherein the RF receive coil element is a flexible and/or foldable and/or RF receive coils of different shapes.

10. A magnetic resonance (MR) imaging system, comprising a radio frequency (RF) receiver system according to claim 1.

11. A method for active decoupling of a radio frequency (RF) receiver system the method comprising the following steps:
    providing a radio frequency (RF) receiver system according to claim 1,
    generating a compensation signal by the signal generator of each RF receive coil element,
    coupling the compensation signal $B\vec{y}$ into the corresponding RF receive coil element by the excitation path and receiving a coupled complex signal vector $\vec{y}=A(\vec{x}+B\vec{y})$ by all RF receive coils elements, wherein $\vec{x}$ is a signal vector received inside the RF receive coil elements without coupling,
    compensating for the coupling of the coupled complex signal vector $\vec{y}=A\vec{x}$.

12. The method according to claim 11 wherein the step of compensating for the coupling of the coupled complex signal vector $\vec{y}=A\vec{x}$ comprises the step of:
    multiplying the vector $\vec{y}$; by a corresponding row of the matrix B for each RF receive coil element and feed the result via the excitation path (4) into the receive signal of the RF receive coil element, wherein $B=A^{-1}-1$, 1 being the identity matrix, and wherein each RF receive coil element comprises a digital receive chain for digitization of the signals received by the RF receive coil elements, the digital receive chain of each RF receive coil element comprising a controller, wherein the step of multiplying the corresponding row of the matrix B with the vector $\vec{y}$ is performed on the controller.

13. A method for active decoupling of a radio frequency (RF) according to claim 11, the method comprising:
    compensating for the coupling of the coupled complex signal vector $\vec{y}=A\vec{x}$ by multiplying $\vec{y}$; with the inverse $A^{-1}$ from the left.

14. A software package for a magnetic resonance (MR) imaging system, whereby the software package contains instructions for controlling a radio frequency (RF) receiver system according to claim 11.

15. A software package for upgrading a magnetic resonance (MR) imaging system, whereby the software package contains instructions stored on a non-transitory computer readable medium, wherein the instructions are configured to control a radio frequency (RF) receiver system according to claim 11.

\* \* \* \* \*